United States Patent Office 3,491,539
Patented Jan. 27, 1970

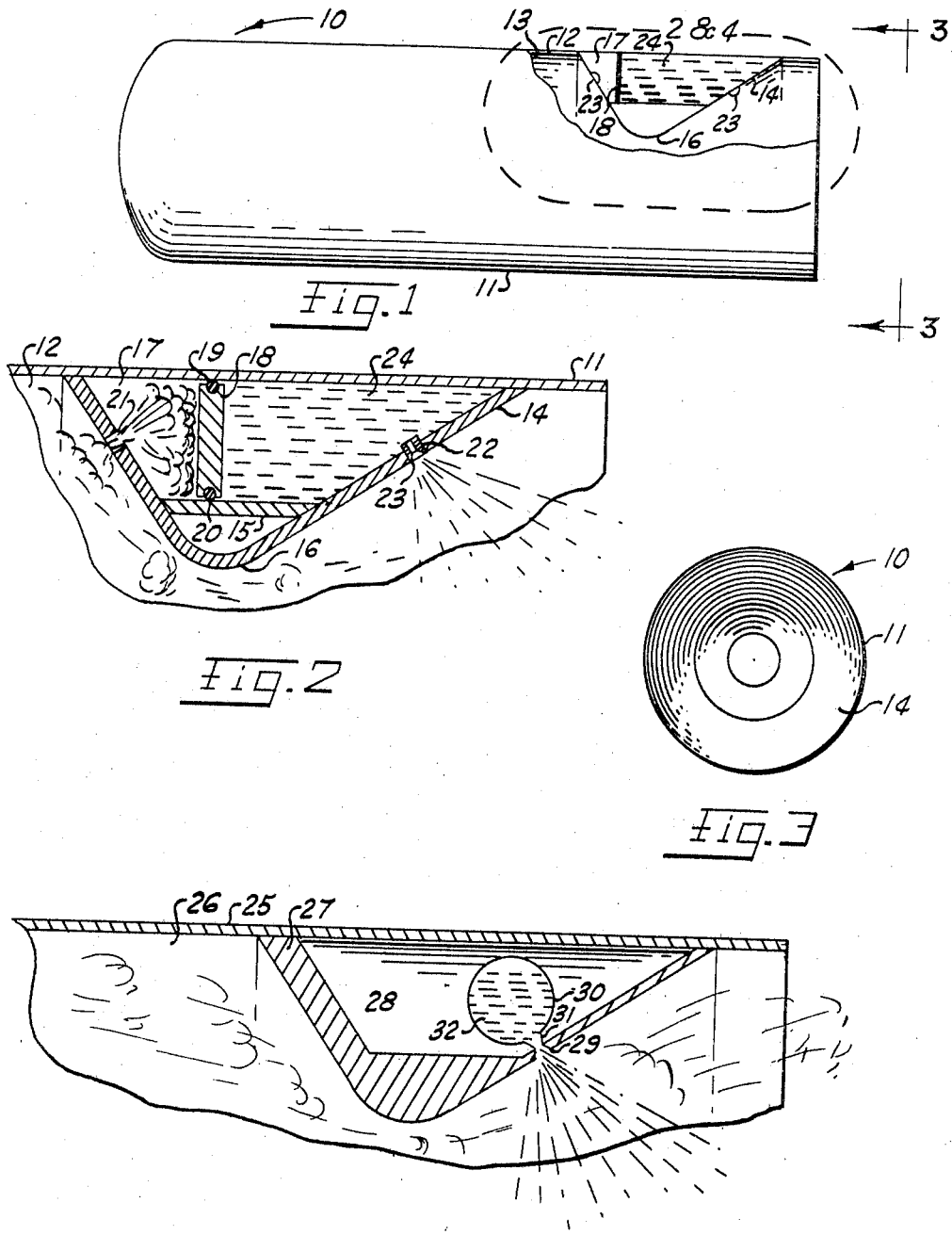

3,491,539
INJECTOR ASSEMBLY FOR ELIMINATING THE SMOKE TRAIL OF A SOLID PROPELLANT ROCKET MOTOR
Grafton F. Mangum, Huntsville, Ala., assignor to Thiokol Chemical Corporation, Bristol, Pa., a corporation of Delaware
Filed July 13, 1967, Ser. No. 653,066
Int. Cl. F02k 9/06
U.S. Cl. 60—251           1 Claim

ABSTRACT OF THE DISCLOSURE

An injector assembly for a solid propellant rocket motor having a pressurized liquid chamber containing a suitable quantity of liquid oxidizer which when injected into the main exhaust stream of the solid propellant rocket motor, will provide complete combustion of any pyrolysis products that are normally contained in the main exhaust stream of the solid propellant rocket motor.

BACKGROUND OF THE INVENTION

Field of the invention

A new requirement has been made for a smokeless solid propellant rocket motor i.e., a solid propellant rocket motor that leaves no smoke trail in conducting the operational mission for which it has been developed.

In surface to surface or surface to air missiles, it is obvious that if the solid propellant rocket motor leaves no smoke trail, it would be difficult to locate the site from which it was launched.

This would be a great advantage since retaliation against the launching site or the solid propellant rocket motor itself, could not be readily achieved if the smoke trail of the solid propellant rocket motor was completely eliminated.

A smokeless solid propellant rocket motor would also be a great asset as far as radar attenuation is concerned.

The instant invention is, therefore, a desirable asset in solid propellant rocketry.

Description of the prior art

Smokeless solid propellants have been and are being developed to provide smokeless solid propellant rocket motors, but partial combustion of the organic liners and insulations provided in the solid propellant rocket motors, usually results in significant amounts of smoke under operational conditions, thus a smokeless solid propellant does not always solve the problem of eliminating the smoke trail of a solid propellant rocket motor.

The elimination of the smoke trail, as envisioned in the instant invention, produces, therefore, a smokeless solid propellant rocket motor, which at the present time is not available.

SUMMARY OF THE INVENTION

This invention, therefore, relates to improvement in injector assemblies for solid propellant rocket motors and more particularly to an injector assembly for injecting an oxidizer into the main exhaust stream of a solid propellant rocket motor, so that the use thereof will entirely eliminate the smoke trail of a solid propellant rocket motor.

Heretofore, except in an attempt to produce smokeless solid propellants, no efforts have been made to eliminate the smoke trail of a solid propellant rocket motor.

However, it has now become desirable to produce solid propellant rocket motors that have no significant smoke trail, so that the location of their launch site or their trajectory through the atmosphere cannot be readily detected.

Regardless, therefore, of the use of smokeless solid propellant, there are always pyrolysis products that accumulate in the main stream of a solid propellant rocket motor that will provide significant amounts of smoke under operational conditions of the solid propellant rocket motor.

It is an object of the invention, therefore, to provide an injector assembly for a solid propellant rocket motor that will inject an oxidizer into the main stream of a solid propellant rocket motor to entirely consume and combust the pyrolysis products in the main stream of the solid propellant rocket motor to eliminate the smoke trail of the solid propellant rocket motor.

With the above and other objects and advantages in view, as well as those that may appear to one skilled in the art, it will be apparent that the invention consists of the novel arrangement of parts more fully hereinafter described, claimed and illustrated in the accompanying drawing in which:

BRIEF DESCRIPTION OF THE DRAWING

FIGURE 1 is a schematic elevational view of a solid propellant rocket motor, partly broken away to show in section the manner of installing one form of the injector assembly embodying the instant invention;

FIGURE 2 is an enlarged fragmentary detailed sectional view of the form of the invention as illustrated in FIGURE 1 and as installed in that area encompassed by the dotted circle 2;

FIGURE 3 is an elevational view of the aft end of the rocket motor of FIGURE 1 as it would appear from the observation thereof on the line 3—3 of FIGURE 1; and FIGURE 4 is an enlarged fragmentary detailed sectional view similar to FIGURE 2 and illustrating another form of the invention as it will be installed in that area encompassed by the dotted circle 4 of FIGURE 1.

DESCRIPTION OF THE PREFERRED EMBODIMENTS

Referring more in detail to the drawing, wherein like parts are designated by like reference numerals, the reference numeral 10 is utilized to designate a solid propellant rocket motor on which both forms of the invention may be installed.

In FIGURES 1 to 3 inclusive, the solid propellant rocket motor 10, as is conventional, comprises a motor case 11 in which is provided a combustion chamber 12 having a solid propellant 13 positioned therein.

Just aft of the solid propellant 13, in the combustion chamber 12 in the motor case 11, a submerged nozzle insert 14 is rigidly secured in the aft end of the motor case 11.

Before the installation of the nozzle insert 14, a circular band 15 is rigidly secured in the outer surface of the nozzle insert 14, parallel to the throat portion 16 thereof, and the circular band 15 provides a container or chamber 17 for a purpose to be later described.

A sectional ring-shaped piston 18, having sealing O-rings 19 and 20 in the inner and outer periphery thereof, is then positioned within the container or chamber 17, as shown in FIGURE 2, for reciprocal movement therein. The nozzle insert 14 is provided with a port 21 that communicates with that portion of the container or chamber 17 that is forward of the piston 18 and a port 22 that communicates with that portion of the container or chamber 17 that is aft of the piston 18 and frangible plugs 23 are inserted into the ports 21 and 22 for the sealing thereof.

After the nozzle insert 14 has been installed and before the port 22 has been sealed with the frangible plug 23, a suitable quantity of a liquid oxidizer 24, such as N₂O₄ or IRFNA, is injected into the container or chamber 17 aft of the piston 18 and the frangible plug 23 is then inserted into the port 22 for the sealing thereof.

In the operation of the form of the invention illustrated in FIGURES 1 to 3 inclusive, and installed as previously described, the solid propellant rocket motor 10 is ready for its operational requirements.

After the ignition of the solid propellant 13 and the creation of the combination products created by such ignition, the frangible plug 23 in the part 21 will be destroyed by the combustion products and the pressure created by the combustion products will impinge upon the forward face of the piston 18 and move it aft within the container or chamber 17. As the liquid oxidizer 24 is pressurized by the movement of the piston 18, the plug 23 in the port 22 will be destroyed and the liquid oxidizer will flow into the main stream of the solid propellant rocket motor 10 and combust and consume any pyrolysis product that may result from unburned liner or insulation that is usually positioned in the motor case 11 intermediate of the motor case 11 and the solid propellant 13 therein.

The merging of the liquid oxidizer 24 with the main stream of the solid propellant rocket motor 10 will thus eliminate any smoke trail that is usually left by the operation of the solid propellant rocket motor that is not equipped with an injector assembly as embodied by the instant invention.

Referring more in detail to FIGURE 4, wherein it will be noted that the reference numeral 25 is used to designate a motor case that is part of a solid propellant rocket motor, as illustrated in FIGURE 1. As is conventional and as previously described, the motor case 11 is provided with a combustion chamber 26 in which a solid propellant, not shown, is positioned.

Just aft of the solid propellant in the combustion chamber 26 in the motor case 25, a submerged nozzle insert 27 is rigidly secured in the aft end of the motor case 25.

The convergent-divergent shape of the nozzle insert 27 provides, with the wall of the motor case 25, an interior chamber 28 and a port 29 in the aft portion of the nozzle insert 27, provides communication between the chamber 28 and that portion of the motor case 25 through which the main stream of combustion products, produced by the burning of the solid propellant, exhausts from the motor case 25 of the solid propellant rocket motor.

Positioned in the chamber 28 is a pressure container or vessel 30 and this container or vessel 30 has a neck portion 31 that is in direct communication with the port 29 in the nozzle insert 27. The pressure container or vessel 30 is rigidly secured in place before the nozzle insert 27 is mounted, as shown in FIGURE 4, so that it will not move from the position shown in FIGURE 4 and the pressure container or vessel 30 is filled with a suitable quantity of a liquid oxidizer 32 such as N₂O₄ or IRFNA which is under pressure and will be released from the pressure container or vessel 30 into the main stream of the solid propellant rocket motor when a frangible plug, that is positioned in the port 29, is destroyed by the heat generated by the main stream of the solid propellant rocket motor. It is to be understood that there may be a plurality of pressure vessels or the pressure vessel may assume a circular tubular body having a plurality of neck portions thereon.

In the operation of the form of the invention illustrated in FIGURE 4, and installed as previously described, the solid propellant rocket motor is ready for its operational requirements.

It is to be understood that the liquid oxidizer 32 is under pressure, therefore, after the ignition of the solid propellant in the combustion chamber 26 and the creation of the combustion products created by such ignition, the frangible plug in the port 29 will be destroyed by the combustion products and the pressurized liquid oxidizer 32 will flow into the main stream of the solid propellant rocket motor and combust and consume any pyrolysis products that may result from unburned liner or insulation that is usually positioned in the motor case 25 intermediate of the motor case 25 and the solid propellant therein.

Thus this form of the invention will obtain the same results as previously set forth for the form of the invention shown in FIGURES 1 to 3 inclusive.

There has thus been described an injector assembly which will, by its operation, eliminate any smoke trail issuing from the nozzle of a solid propellant rocket motor and it is believed that the construction and operation of the invention will be clear to one skilled in the art, it also being understood that any variations that may result in the construction and manner of operation of the invention will be covered, provided such variations fall within the spirit of the invention and the scope of the appended claim.

Having thus described the invention what is claimed as new and desired to be secured by Letters Patent is:

1. An injector assembly for a solid propellant rocket motor including a motor case having a combustion chamber therein, a solid propellant in said combustion chamber and a nozzle insert rigidly secured in the aft end of said motor case comprising a circular band rigidly secured within said nozzle insert in parallel circumjacent relation thereto, said circular band providing a container having a liquid oxidizer therein internally of said nozzle insert, a sectional ring-shaped piston having sealing means thereon mounted in the chamber in said nozzle insert, ports forward and aft of said piston to provide communication between said container and that portion of the motor case through which the products of combustion created by the burning of said solid propellant are exhausted, frangible means for sealing said ports and whereby when said last said means is destroyed the products of combustion will enter the ports forward of said piston to create pressure thereon to force the liquid oxidizer in said container to merge with the products of combustion to combust and consume any products of pyrolysis that remain in the products of combustion exhausting from the solid propellant rocket motor through the nozzle insert for the solid propellant rocket motor.

References Cited

UNITED STATES PATENTS

| 2,753,801 | 7/1956 | Cumming | 60—251 |
| 3,066,485 | 12/1962 | Bertin et al. | 60—231 |
| 3,132,475 | 5/1964 | Hopper | 60—261 XR |
| 3,133,413 | 5/1964 | Lawrence | 60—231 XR |
| 3,182,445 | 5/1965 | Lowes | 60—261 XR |
| 3,233,833 | 2/1966 | Bertin et al. | 60—231 XR |

CARLTON R. CROYLE, Primary Examiner

U.S. Cl. X.R.

60—253, 259, 261, 264, 39.48